United States Patent
Sterkenburgh et al.

(10) Patent No.: US 12,320,175 B2
(45) Date of Patent: Jun. 3, 2025

(54) SLIDING COVER ASSEMBLY FOR A VEHICLE, IN PARTICULAR FOR A WATERBORNE VEHICLE

(71) Applicant: Webasto SE, Stockdorf (DE)

(72) Inventors: Sybrand Sterkenburgh, Nijeveen (NL); Jan Hesselink, Kampen (NL)

(73) Assignee: WEBASTO SE, Stockdorf (DE)

( * ) Notice: Subject to any disclaimer, the term of this patent is extended or adjusted under 35 U.S.C. 154(b) by 675 days.

(21) Appl. No.: 17/617,823

(22) PCT Filed: May 13, 2020

(86) PCT No.: PCT/EP2020/063368
§ 371 (c)(1),
(2) Date: Dec. 9, 2021

(87) PCT Pub. No.: WO2020/259915
PCT Pub. Date: Dec. 30, 2020

(65) Prior Publication Data
US 2022/0228412 A1    Jul. 21, 2022

(30) Foreign Application Priority Data
Jun. 28, 2019    (DE) .................... 10 2019 117 512.7

(51) Int. Cl.
*E05D 15/56*    (2006.01)
*B60J 7/043*    (2006.01)
(Continued)

(52) U.S. Cl.
CPC ............ *E05D 15/565* (2013.01); *B63B 19/18* (2013.01); *E05F 5/003* (2013.01); *B60J 7/043* (2013.01);
(Continued)

(58) Field of Classification Search
CPC ........ E05D 15/565; B63B 19/18; E05F 5/003; E05Y 2201/218; E05Y 2201/244;
(Continued)

(56) References Cited

U.S. PATENT DOCUMENTS

| 6,098,432 A | 8/2000 | Spies |
| 2012/0169091 A1 | 7/2012 | Renaudin |

(Continued)

FOREIGN PATENT DOCUMENTS

| CN | 1224481 A | 7/1999 |
| CN | 102001418 A | 4/2011 |

(Continued)

OTHER PUBLICATIONS

Office Action from a related CN Application No. 202080047522.0; mailed Apr. 13, 2023 in Chinese with machine translation (22 Pages).

(Continued)

*Primary Examiner* — Andrew Polay
(74) *Attorney, Agent, or Firm* — Fitch, Even Tabin & Flannery LLP

(57) ABSTRACT

A sliding cover assembly for a vehicle, in particular a waterborne vehicle, the sliding cover assembly having a cover element displaceable between a closed position, in which a roof opening is closed, and an open position, in which the roof opening is at least partially open, and a displacement mechanism for the cover element, the displacement mechanism having a slider on either side of a longitudinal center plane of the cover element, each slider being guided in a sliding manner in a respective guide rail attached to the roof, and a raising lever connected to the cover element being hinged to each slider. The sliders each have a slider body and a control element which is mounted on the slider body in such a manner that it can rotate about (Continued)

an axis of rotation and to which the respective raising lever is hinged eccentrically relative to the axis of rotation.

15 Claims, 7 Drawing Sheets

(51) Int. Cl.
  *B63B 19/18* (2006.01)
  *E05F 5/00* (2017.01)
(52) U.S. Cl.
  CPC ... *E05Y 2201/218* (2013.01); *E05Y 2201/244* (2013.01); *E05Y 2201/26* (2013.01); *E05Y 2201/684* (2013.01); *E05Y 2201/708* (2013.01); *E05Y 2900/514* (2013.01)
(58) Field of Classification Search
  CPC ........... E05Y 2201/26; E05Y 2201/684; E05Y 2201/708; E05Y 2900/514; B60J 7/043; B60J 7/024
  See application file for complete search history.

(56) References Cited

U.S. PATENT DOCUMENTS

| | | | |
|---|---|---|---|
| 2014/0054934 A1 | 2/2014 | Vogel | |
| 2018/0009296 A1 | 1/2018 | Heidan | |
| 2018/0099547 A1 | 4/2018 | Biewer | |
| 2018/0273145 A1* | 9/2018 | Pugh | B60J 7/0435 |

FOREIGN PATENT DOCUMENTS

| | | |
|---|---|---|
| CN | 102470737 A | 5/2012 |
| CN | 103625256 A | 3/2014 |
| CN | 107428229 A | 12/2017 |
| CN | 107933263 A | 4/2018 |
| DE | 543646 C | 2/1932 |
| DE | 1233742 B | 2/1967 |
| DE | 102009043130 A1 | 5/2011 |
| DE | 102017204494 A1 | 9/2018 |
| JP | S5993996 U | 6/1984 |

OTHER PUBLICATIONS

E-Nautica Boat Parts; Luke Lewmar PILOT 40 Silber; https://e-nautica.de/pilot/9122-luke-lewmar-pilot-40-silber-getoentes-glas.html; in German (4 Pages).

Lewmar Marine Equipment Guide; https://docweb.osculati.com/flip/lewmar-2019/; Lewmar Ltd. 2018 in English (3 Pages).

International Preliminary Report on Patentability for Application No. PCT/EP2020/063368; dated Jan. 6, 2022 in English.

"BLA Trade Talk: Steve Morris demonstrates the Lewmar Pilot Hatch," marinebusiness; Youtube.com; published Sep. 1, 2015. (Mentioned in ISR).

EPO; International Search Report for Application No. PCT/EP2020/063368; dated Sep. 1, 2020. (in English and German).

* cited by examiner

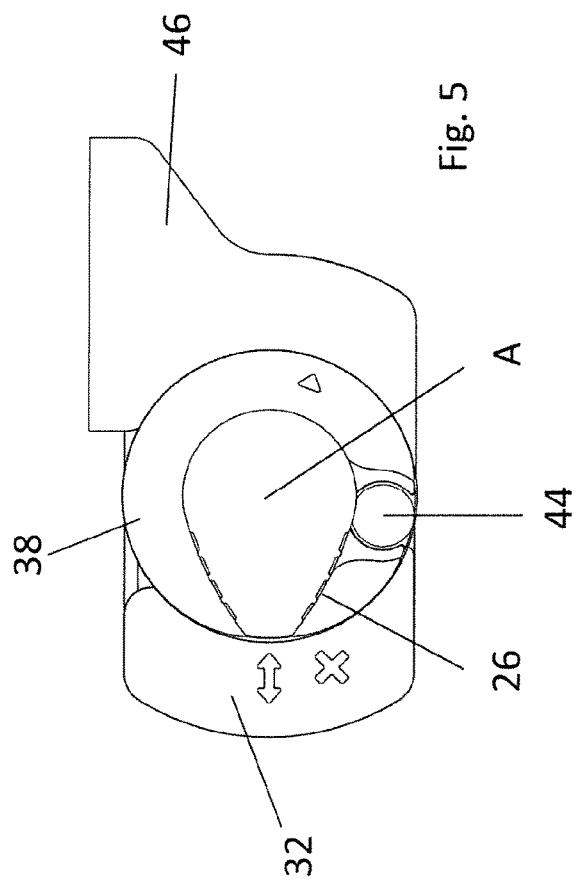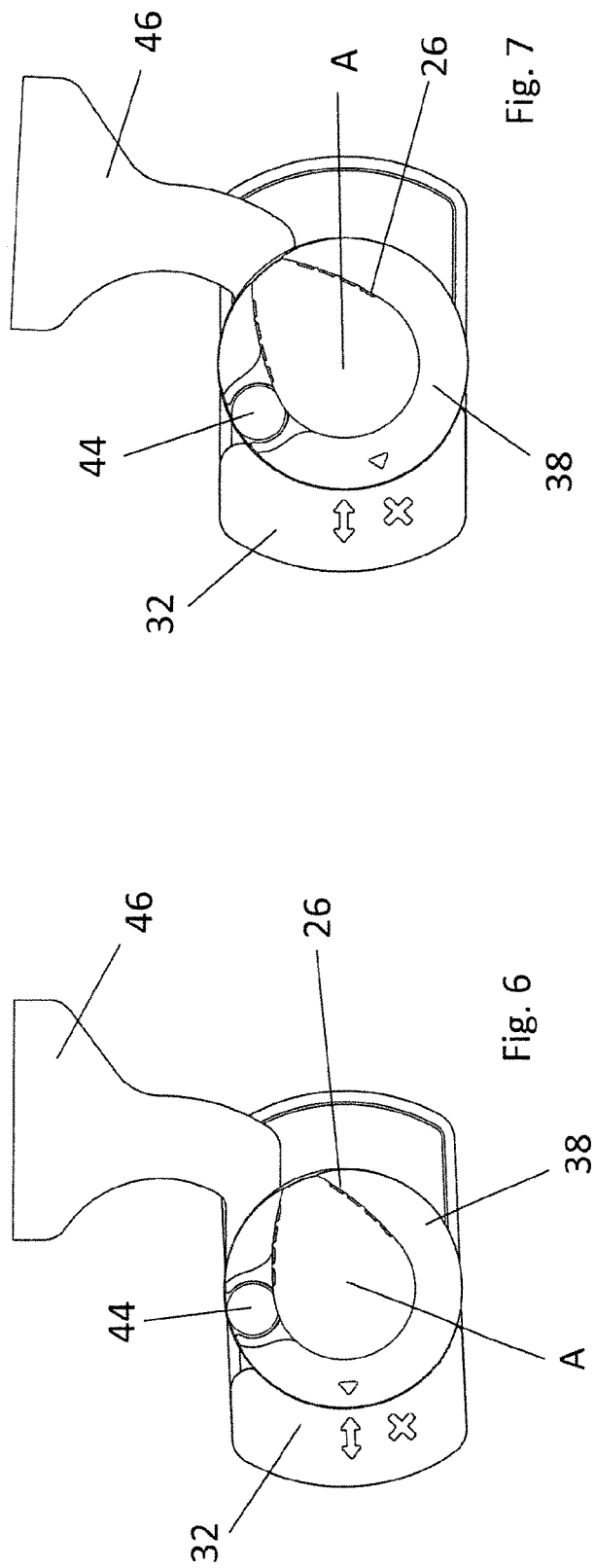

SLIDING COVER ASSEMBLY FOR A VEHICLE, IN PARTICULAR FOR A WATERBORNE VEHICLE

CROSS-REFERENCE TO RELATED APPLICATION

This application is a U.S. national phase application filed under 35 U.S.C. § 371 of International Application No. PCT/EP2020/063368, filed May 13, 2020, designating the United States, which claims priority from German Patent Application Number DE 10 2019 117 512.7, filed Jun. 28, 2019, which is hereby incorporated herein by reference in its entirety for all purposes.

FIELD

The invention relates to a sliding cover assembly for a vehicle, in particular for a waterborne vehicle, the sliding cover assembly comprising the features of the preamble of claim 1.

BACKGROUND

A sliding cover assembly of this kind is known from practice and is in particular a sliding hatch of a ship which can be disposed on a roof of a cabin or of a cockpit of a motor yacht. This sliding cover assembly comprises a cover element configured to be displaced between a closed position, in which a roof opening is closed, and an open position, in which the roof opening is at least partially open. In the open position, the cover element is moved in the longitudinal vehicle direction relative to the roof opening. For displacing the cover element, the known sliding cover assembly has a displacement mechanism comprising a slider on either side of a longitudinal center plane of the cover element, each slider being guided in a sliding manner in a respective guide rail attached to the roof. The cover element can be moved in the longitudinal direction by sliding the sliders in the guide rails. In order for the cover element to be shifted, it usually has to be raised first, i.e., it has to be brought into a lifted position. To this end, raising levers hinged to the sliders and connected to the cover element can be provided. Moving the cover element of the known sliding cover assembly between the lowered closed position and the raised position tends to require a lot of strength.

SUMMARY

The object of the invention is to provide a sliding cover assembly that is configured in the manner described above and that can be conveniently displaced between the closed position and a raised position.

According to the invention, this object is attained by the sliding cover assembly having the features of claim 1.

So according to the invention, a sliding cover assembly is proposed whose raising levers are each configured as an eccentric lever which is eccentrically hinged to a respective control element, which is in particular configured as a control disk. Operation of the control element, i.e., a rotation of the control element relative to the slider body, leads to a lifting motion of the cover element relative to the guide rails. By rotating the control elements in one direction, the cover element is raised out of the closed position. By rotating the control elements in the other direction, the cover element is pulled against the guide rails and preferably against a weatherstrip.

In order to be able to operate the control elements synchronously, they are connected to each other for co-rotation via an operating bar in a preferred embodiment of the sliding cover assembly according to the invention. Thus, the operating bar, which in particular has a cross section that is not circular in order to facilitate operation, is the handle by means of which a user can manually operate the sliding cover assembly in a comfortable manner.

In order to be able to also secure the cover element against movement in the longitudinal direction when in the raised open position and to therefore also be able to improve the noise behavior of the sliding cover assembly, a brake is disposed on each of the slider bodies in an advantageous embodiment of the sliding cover assembly according to the invention, each brake being operable by the respective control element and fixing the respective slider in the longitudinal guide rail direction when operated. In a certain rotated position of the control elements, they act on the brake in such a manner that the slider bodies and therefore the sliders cannot be moved in the longitudinal rail direction because of the clamping force exerted by the brakes. The brake can be activated in any displaced position of the cover element, such as a ventilation position, in which the cover element is not moved in the longitudinal rail direction compared to the closed position.

In a specific embodiment of the brake, at least one brake tab which can be elastically pushed against the respective guide rail by means of the respective control element is provided in each case. So the brake tabs are elastic, which means that the control elements can push the brake tabs against the guide rails and the brake tabs can spring back into a respective open position when the control force exerted by the control elements is absent.

A braking element, which is preferably made of rubber, can be disposed on each of the brake tabs in order to increase the braking force. The rubber, i.e., the braking element, is adapted to the material of the guide rails, which can be made of aluminum, for example, in terms of the material mixture in order to optimize the friction coefficient and therefore the braking force.

In order to be able to transmit the control force from the control elements to the brakes, it is advantageous if at least one control projection or a control protrusion interacting with a ramp of the brake is formed on each of the control elements. When the control projection strikes the ramp of the brake, the latter is pushed—in particular against a spring force—into the braking position, in which the brake is in full contact with the respective guide rail.

In a preferred embodiment of the sliding cover assembly according to the invention, the control elements can each be adjusted between a closed position, in which the cover element is lowered and the roof opening is closed, a sliding position, in which the cover element is raised and can be moved in the longitudinal rail direction, and a locked position, in which the cover element is raised and secured against being moved in the longitudinal rail direction. In the locked position, the brakes disposed on the slider bodies interact with the guide rails.

In order to make a user aware that the different positions have been reached, an advantageous embodiment of the sliding cover assembly according to the invention has a latch member which defines the closed position, the sliding position, and the locked position.

For example, the latch member comprises a spring-loaded ball which interacts with corresponding recesses. The spring-loaded ball latches into one of the recesses in each of the different positions, which allows the user to recognize that the respective position has been reached.

In an advantageous embodiment of the sliding cover assembly according to the invention, the spring-loaded ball is mounted on the slider body, whereas the recesses are disposed on the control element.

In the closed position, the cover element is preferably pushed against a frame, which is attached to the vehicle, via a circumferential weatherstrip member and held in position by means of the raising levers, which are configured as eccentric levers. So the closing force exerted by the eccentric levers suffices to secure the cover element against being moved when in the closed position. The weatherstrip member can be attached to the cover element and/or to the frame attached to the roof.

In order to ensure reliable operation of the cover element, two other sliding elements can be disposed thereon, each sliding element being guided in a guiding member. So the cover element is bilaterally supported on the sliders with the slider bodies and the control elements on one side and on one of the other sliding elements in each case on the other side.

The invention also relates to a waterborne vehicle comprising a sliding cover assembly of the kind described above.

Other advantages and advantageous configurations of the subject matter of the invention are apparent from the description, the drawings, and the claims.

BRIEF DESCRIPTIONS OF THE DRAWINGS

An example of an embodiment of a sliding cover assembly according to the invention is schematically illustrated in the drawing and will be discussed in more detail in the following description.

FIG. 5 is a side view of a slider and a raising lever of the sliding cover assembly for a closed position of the sliding cover assembly;

FIG. 6 is a view of the slider and the raising lever corresponding to FIG. 5 but for a sliding position of the sliding cover assembly;

FIG. 7 is another view of the slider and the raising lever corresponding to FIG. 5 but for a locked position of the sliding cover assembly;

DETAILED DESCRIPTION

Figure 1:
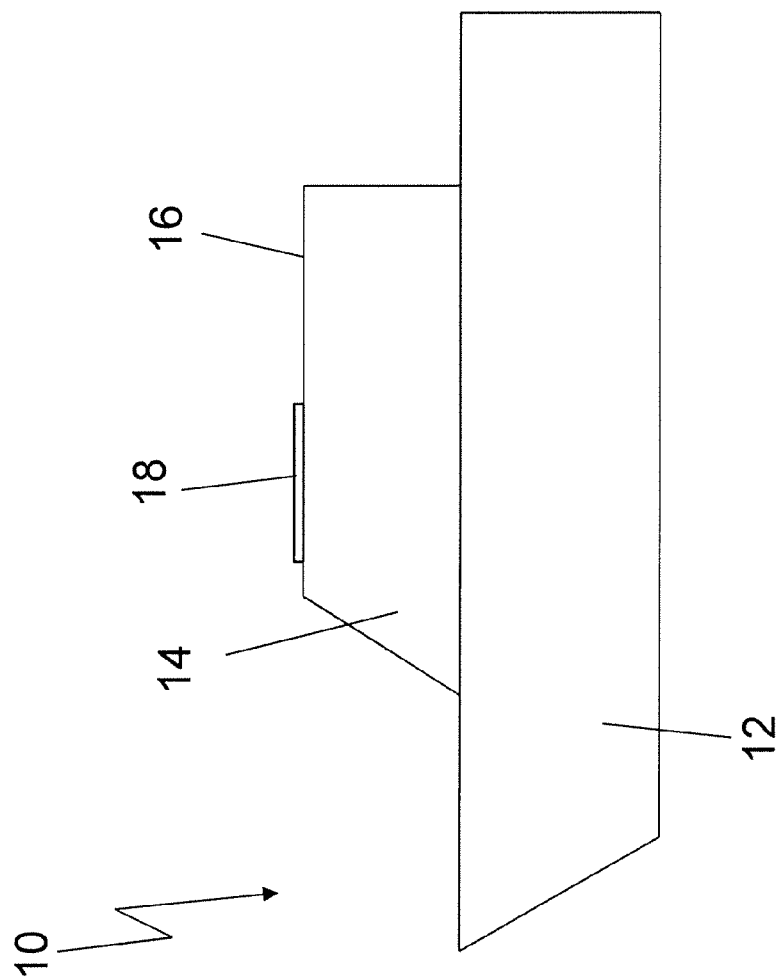
FIG. 1 is a highly schematic side view of a motor yacht comprising a sliding cover assembly.

FIG. 1 shows a motor yacht 10 having a ship body 12 comprising a cabin 14 in which a cockpit or the like is disposed. Cabin 14 has a cabin roof 16 provided with a sliding cover assembly 18, which consequently forms what is referred to as a sliding hatch.

Figure 2:
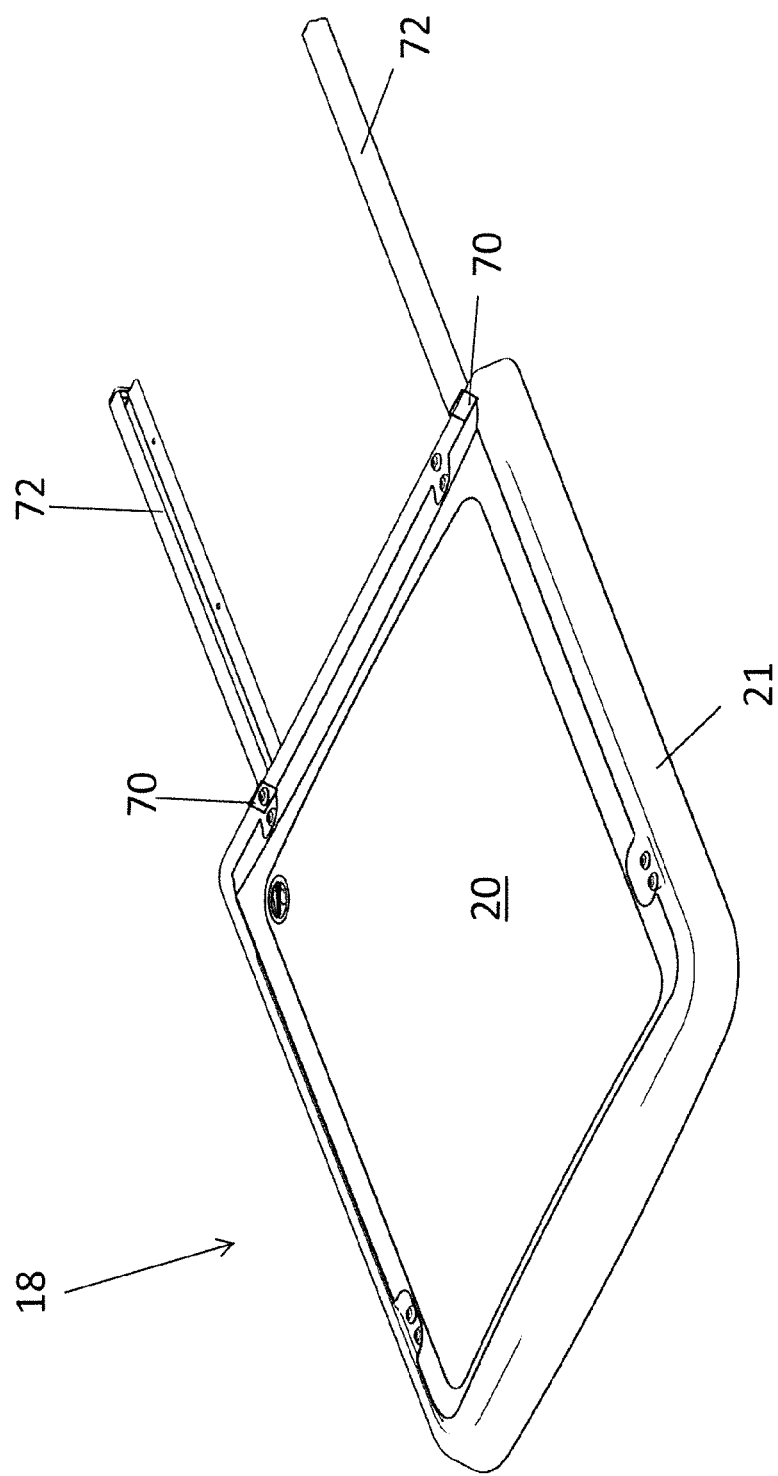
FIG. 2 is a perspective top view of the isolated sliding cover assembly.
Figure 3:
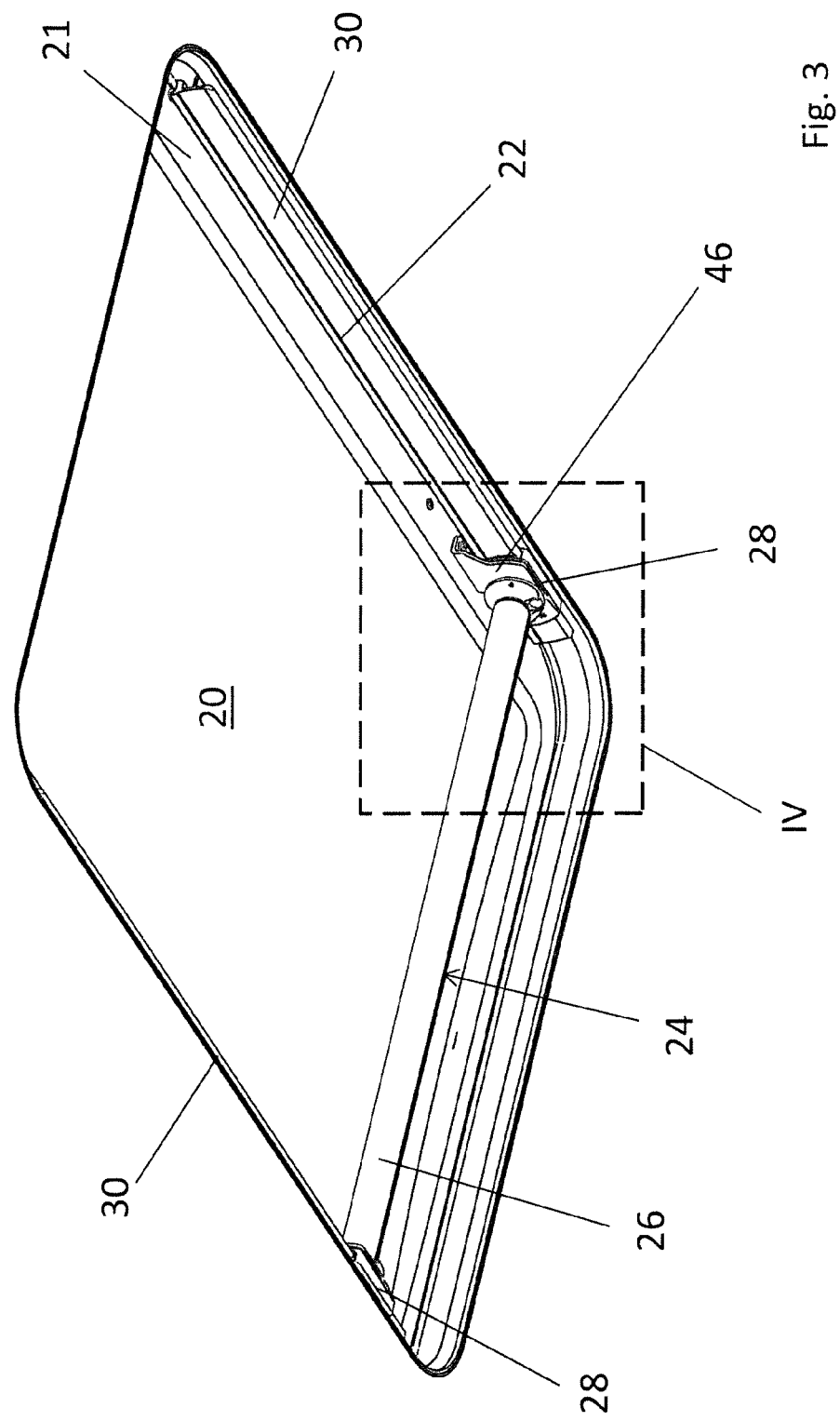
FIG. 3 is a perspective bottom view of the sliding cover assembly.
Figure 4:
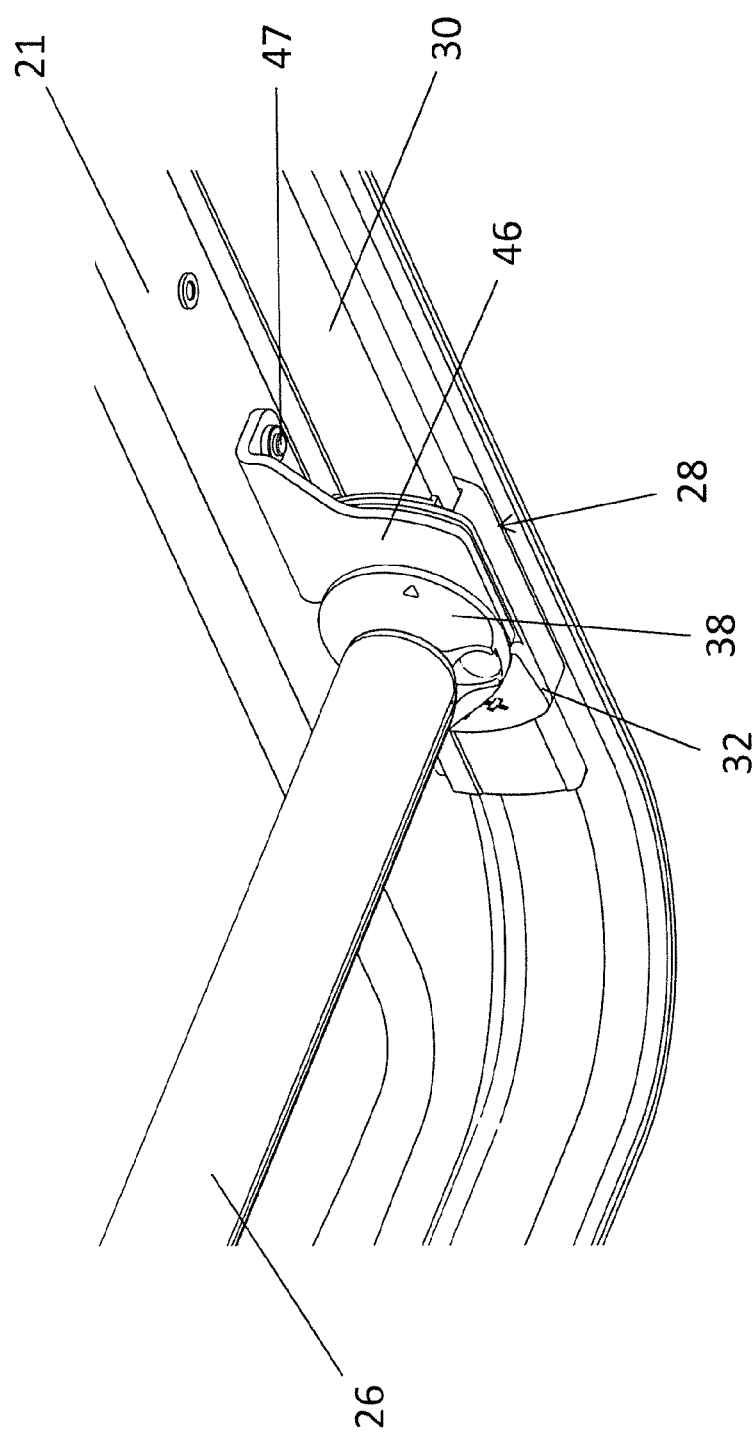
FIG. 4 is an enlarged view of area IV in FIG. 3.
Figure 9:
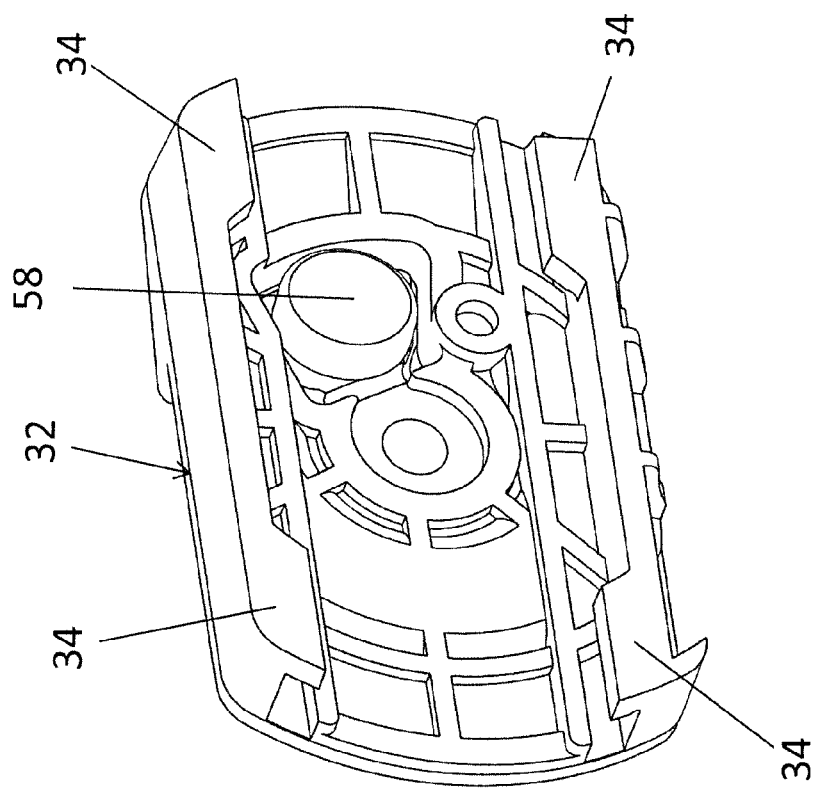
FIG. 9 is a perspective rear view of the slider body.
Figure 8:
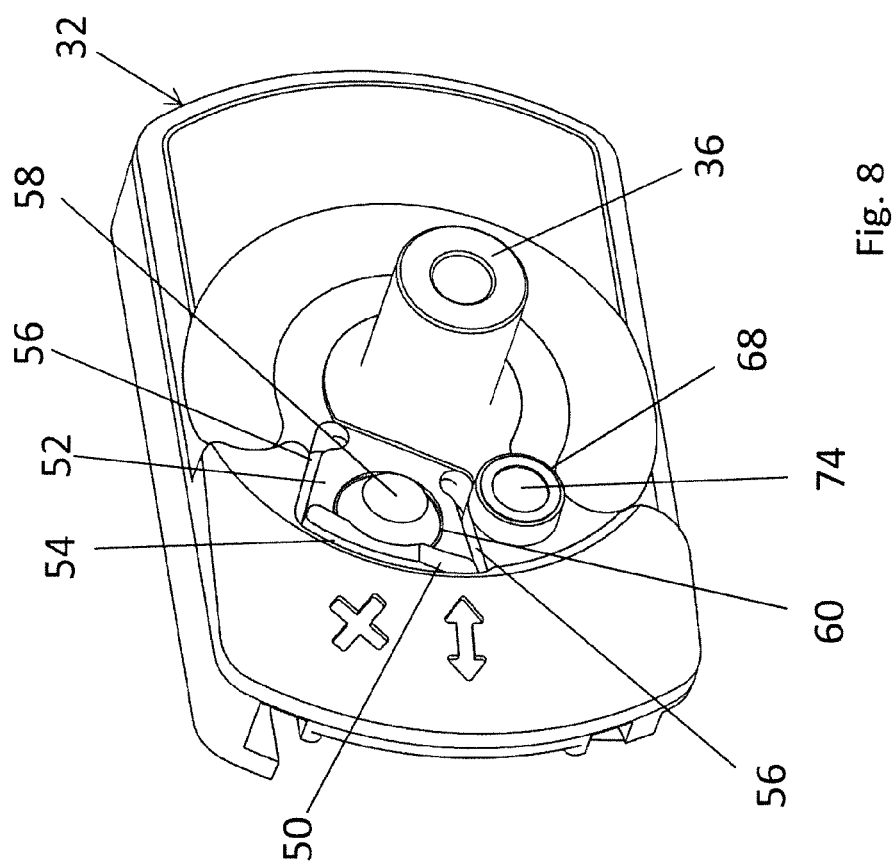
FIG. 8 is a perspective front view of a slider body of the slider.
Figure 11:
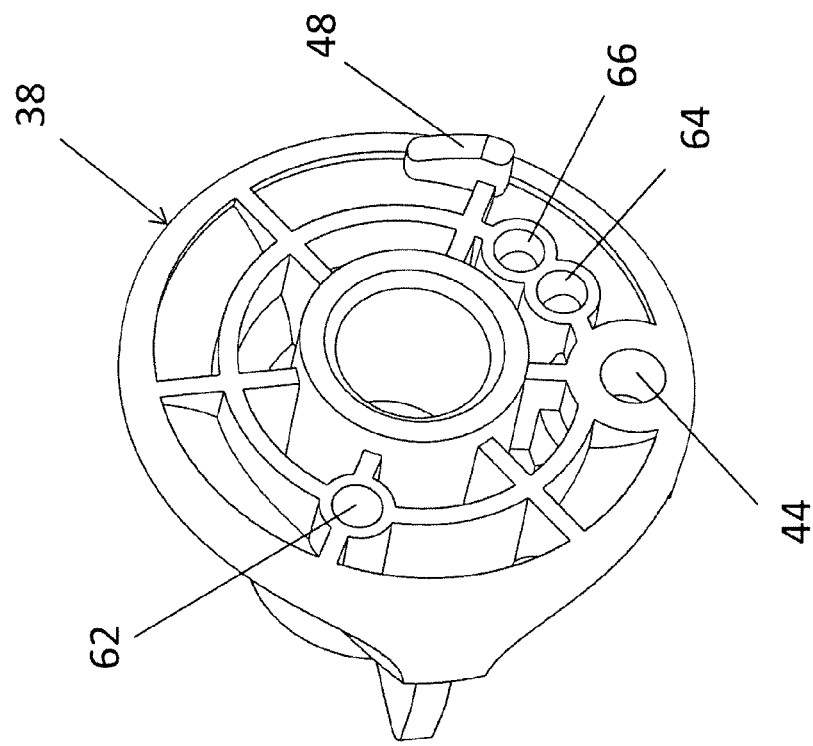
FIG. 11 is a perspective rear view of the control element.
Figure 10:
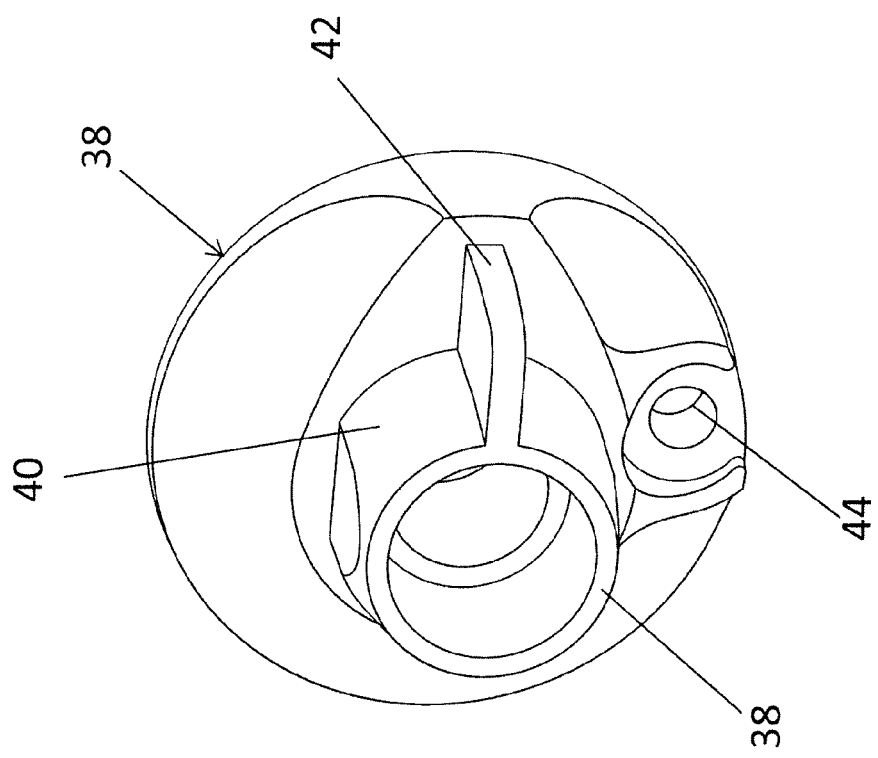
FIG. 10 is a perspective front view of a control element of the slider.

Sliding cover assembly 18, which is illustrated in detail in FIGS. 2 to 11, comprises a cover element 20 which is made of a transparent plastic material, such as polycarbonate, and which is provided with a frame 21 and which can be displaced between the closed position illustrated in FIGS. 1 and 2, in which a roof opening 22 is covered or closed, and an open position, in which roof opening 22 is at least partially open.

For displacing cover element 20, sliding cover assembly 18 comprises a displacement mechanism 24 having an operating bar 26 which extends across roof opening 22 in the transverse direction and which is made of an aluminum profile and which has an at least approximately egg-shaped cross section.

Operating bar 26 connects two sliders 28 which are each guided in a displaceable manner on a guide rail 30 attached to the vehicle and extending in the longitudinal ship direction at the respective lateral edge of roof opening 22 and formed by an extruded aluminum profile.

Sliding cover assembly 18 is mirror-symmetrical with respect to the vertical longitudinal center roof plane, which is why only the assembly of the displacement mechanism disposed on the right with respect to the forward direction of travel of the ship will be described hereafter. The assembly of the displacement mechanism disposed on the left with respect to the forward direction of travel is configured analogously.

Sliders 28 each have a slider body 32, which is a plastic injection-molded part and upper and lower grip portions 34 of which engage behind respective guide rail 30.

A wheel-type control element 38 is mounted on slider body 32 via a bearing journal 36 in such a manner that it can rotate about an axis of rotation A. On its side facing away from slider body 32, control element 38 has a ring 40 with a conical circumferential surface, ring 40 being concentric relative to bearing journal 36 and having a radially oriented protrusion 42. Operating bar 26 is slid onto ring 40 and protrusion 42 and is thereby connected to control element 38 for co-rotation. In the case at hand, control element 38 is configured as a control disk having a circular outline. However, the control disk can also have a polygonal outline. Furthermore, the control element can also be configured in the manner of a pivotably mounted link which is connected to the raising lever via a hinge point.

A hinge point 44 is formed on control element 38, which is also a plastic injection-molded part, in an eccentric manner relative to axis of rotation A, a raising lever 46 being hinged to control element 38 via hinge point 44, raising lever 46 having a largely L-shaped outline and being attached to frame 21 of cover element 20 via attachment points 47 at its end facing away from hinge point 44. The eccentric mounting of raising lever 46 has the effect that cover element 20 undergoes a lifting motion or a lowering motion when operating bar 26 is operated, i.e., when operating bar 26 is rotated about axis of rotation A.

On the side facing slider body 32, control element 38 has a control projection 48 which is associated with a brake and which interacts with a ramp 50 formed on a brake tab 52 which is an integral part of slider body 32 and which is concentrically defined by a slot 54 and two radial slots 56 with respect to axis of rotation A. On the side facing away from ramps 50, a braking element 58 is formed on brake tab 52, braking element 58 being formed by a rubber element whose foot is inserted into a hole 60 of brake tab 52.

Three recesses 62, 64 and 66 are formed on the inner side of control element 38 which interact with a latch member 68 formed by a spring-loaded ball 74 and disposed on the side of slider body 32 facing control element 38. Recess 62 defines a closed position of control element 38, which is associated with the closed position of cover element 20.

Recess 64 defines a sliding position, which is associated with an open position of cover element 20 and in which the cover element can be moved in the longitudinal rail direction. Recess 66 defines a locked position, in which cover element 20 is raised and secured against being moved in the longitudinal rail direction by the brake. In the locked position, control projection 48 has moved onto ramp 50 of brake tab 52 with the result that braking element 58 is pushed against guide rail 30 and slider 28 is thus secured against being moved in the longitudinal rail direction. In each of these positions, ball 74 of latch member 68 latches into one of recesses 62, 64 and 66 of control element 38.

Cover element 20 is additionally provided with sliding elements 70 which are disposed at the rear and via which it is supported on rear guide rails 72, which are attached to the roof, at its rear edge.

The sliding cover assembly described above works in the manner described below.

Starting from the closed position illustrated in FIGS. 1, 2 and 6, in which the cover element 20 is pulled against a frame of roof opening 22, which is attached to the roof, via a weatherstrip member (not shown) and hinge point 44 of raising lever 46 is in an over-center position relative to axis of rotation A, operating bar 26 can be manually rotated in the counterclockwise sense with respect to the illustration in FIGS. 5 to 7. This causes ball 74 of latch member 68 to leave recess 62, and cover element 20 is lifted or raised by raising levers 46. Operating bar 26 is turned until ball 74 of latch member 68 drops into recess 64. At this point, the sliding position of control element 38 is reached and cover element 20 can be moved rearward. The sliding position is also indicated to a user by a double arrow on slider body 32, an arrow imprinted on control element 38 pointing at said double arrow (see FIG. 6).

In order to be able to secure cover element 20 against being moved further or back when in the raised position, operating bar 26 can be rotated further in the counterclockwise sense until the ball of latch member 68 drops into recess 66 of control element 38. At this point, the locked position of control element 38 is reached, in which its control projection 48 strikes ramp 50 of brake tab 52 and pushes braking element 58 against guide rail 30. Slider 28 can then no longer be moved on guide rail 30. In the locked position, ball 74 of latch member 68 drops into recess 66. The arrow imprinted on control element 38 then points at an X on slider body 32 (see FIG. 7).

Cover element is displaced from the open position into the closed position in the analogously opposite manner.

REFERENCE SIGNS 10 motor yacht
12 ship body
14 cabin
16 cabin roof
18 sliding cover assembly
20 cover element
21 frame
22 roof frame
24 displacement mechanism
26 operating bar
28 slider
30 guide rail
32 slider body
34 grip portion
36 bearing journal
38 control element
40 ring
42 protrusion
44 hinge point
46 raising lever
47 attachment point
48 control projection
50 ramp
52 brake tab
54 slot
56 radial slot
58 braking element
60 hole
62 recess
64 recess
66 recess
68 latch member
70 sliding element
72 guide rail
74 ball

The invention claimed is:

1. A sliding cover assembly for a waterborne vehicle, the sliding cover assembly comprising:
a cover element configured to be displaced between a closed position, in which a roof opening is closed, and an open position, in which the roof opening is at least partially open, and
a displacement mechanism for the cover element,
the displacement mechanism having a slider on either side of a longitudinal center plane of the cover element, each slider being guided in a sliding manner in a respective guide rail attached to the roof, and a raising lever connected to the cover element being hinged to each slider,
wherein the sliders each comprise a slider body and a control element which is mounted on the slider body in such a manner that it can rotate about an axis of rotation and to which the respective raising lever is hinged eccentrically relative to the axis of rotation and
wherein a brake is disposed on each slider body, each brake being operable by the respective control element and fixing the respective slider in the longitudinal guide rail direction when in the operated state.

2. The sliding cover assembly according to claim 1, wherein the control elements disposed on either side are connected to each other for co-rotation via an operating bar.

3. The sliding cover assembly according to claim 1, wherein the brakes each comprise a brake tab which is configured to be elastically pushed against the respective guide rail by the respective control element.

4. The sliding cover assembly according to claim 3, wherein a braking element, is disposed on each brake tab.

5. The sliding cover assembly according to claim 1, wherein at least one control projection interacting with a ramp of the brake is disposed on each control element.

6. The sliding cover assembly according to claim 1, wherein the control elements are configured to be adjusted between a closed position, in which the cover element is lowered, a sliding position, in which the cover element is raised and displaceable in the longitudinal rail direction, and a locked position, in which the cover element is raised and secured against being moved in the longitudinal rail direction.

7. A sliding cover assembly for a waterborne vehicle, the sliding cover assembly comprising:

a cover element configured to be displaced between a closed position, in which a roof opening is closed, and an open position, in which the roof opening is at least partially open, and a displacement mechanism for the cover element, the displacement mechanism having a slider on either side of a longitudinal center plane of the cover element, each slider being guided in a sliding manner in a respective guide rail attached to the roof, and a raising lever connected to the cover element being hinged to each slider, wherein the sliders each comprise a slider body and a control element which is mounted on the slider body in such a manner that it can rotate about an axis of rotation and to which the respective raising lever is hinged eccentrically relative to the axis of rotation, wherein the control elements are configured to be adjusted between a closed position, in which the cover element is lowered, a sliding position, in which the cover element is raised and displaceable in the longitudinal rail direction, and a locked position, in which the cover element is raised and secured against being moved in the longitudinal rail direction, and wherein a latch member defines the closed position, the sliding position and the locked position.

8. The sliding cover assembly according to claim 7, wherein the latch member comprises a spring-loaded ball interacting with corresponding recesses.

9. The sliding cover assembly according to claim 8, wherein the spring-loaded ball is mounted on the slider body and the recesses are disposed on the control element.

10. The sliding cover assembly according to claim 1, wherein the cover element is pushed against a frame, which is attached to the roof, via a circumferential weatherstrip and is held in position when in the closed position.

11. The sliding cover assembly according to claim 1, wherein two other sliding elements, which are each guided in a guide rail, are disposed on the cover element.

12. A waterborne vehicle comprising a sliding cover assembly according to claim 1.

13. The sliding cover assembly according to claim 7, wherein the cover element is pushed against a frame, which is attached to the roof, via a circumferential weatherstrip and is held in position when in the closed position.

14. The sliding cover assembly according to claim 7, wherein two other sliding elements, which are each guided in a guide rail, are disposed on the cover element.

15. A waterborne vehicle comprising a sliding cover assembly according to claim 7.

* * * * *